Oct. 31, 1950     C. W. MOTT     2,527,840
PLOW DEPTH CONTROL
Filed July 29, 1948
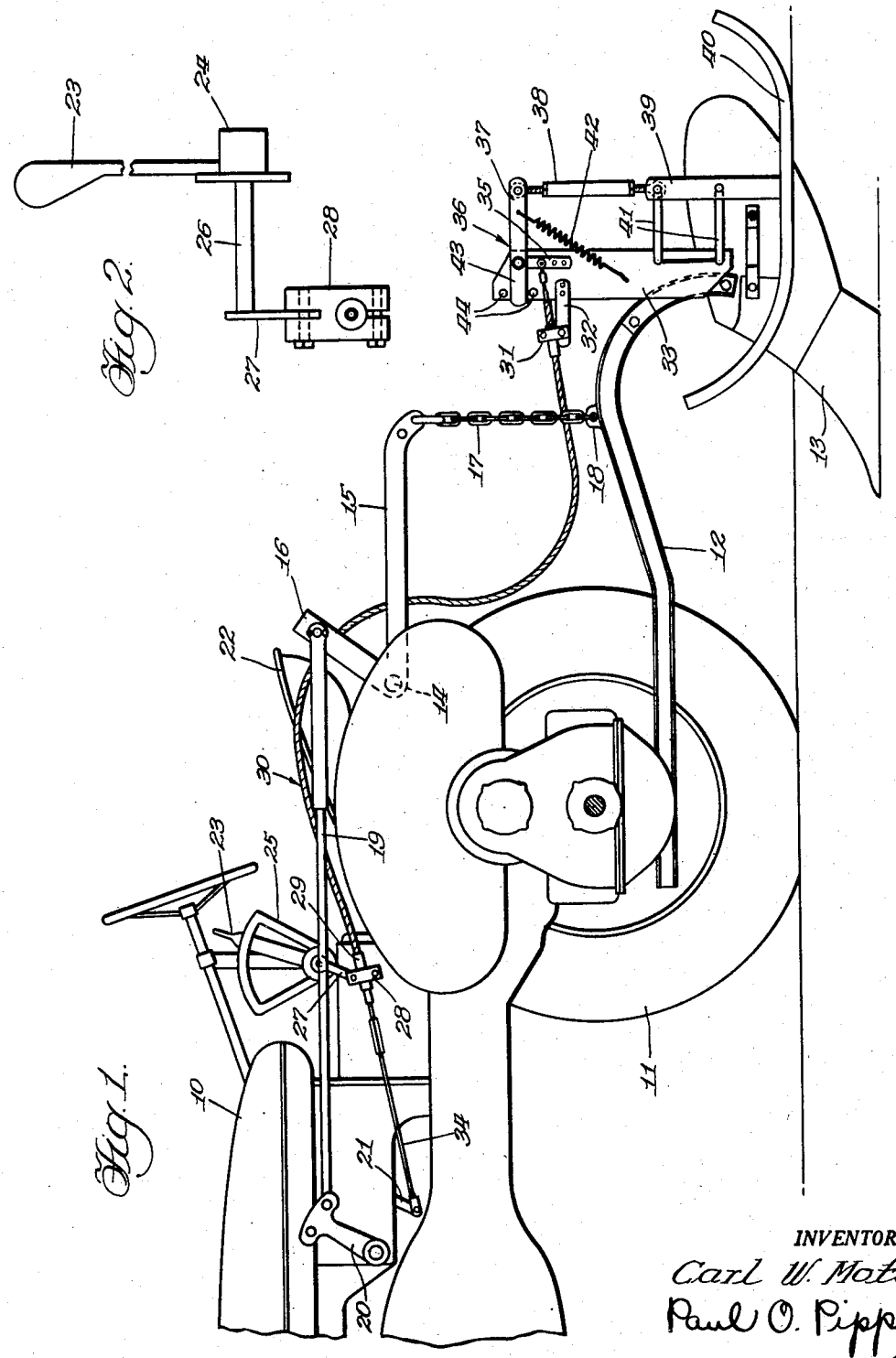
INVENTOR.
Carl W. Mott
Paul O. Pippel
Atty.

Patented Oct. 31, 1950

2,527,840

UNITED STATES PATENT OFFICE 2,527,840

PLOW DEPTH CONTROL

Carl W. Mott, Lake Ozark, Mo., assignor to International Harvester Company, a corporation of New Jersey Application July 29, 1948, Serial No. 41,342

5 Claims. (Cl. 97—50)

This invention relates to a depth control for agricultural implements, and more particularly to mechanism for controlling the operating depth of tractor-mounted plows.

The present invention is concerned with control means for plows and the like adapted to be mounted upon a tractor having power lift means, preferably of the fluid-actuated type deriving power from the tractor, for moving the plow between operating and transport positions, and the principal object of the invention is to provide means for regulating the operating depth of the plow when variations in soil conditions are encountered.

Another object of the invention is to provide in a tractor-connected plow, novel means for automatically adjusting the depth of operation of the tool when variations in soil conditions are encountered.

Another object of the invention is to provide in a tractor-propelled plow having a ground-contacting gauging device associated therewith and movable with respect thereto, novel means for transmitting movement of the gauge device to the power lift to raise or lower the operating depth of the tool.

A further object of the invention is to provide in an implement of the type described a flexible cable connecting the gauge device and the power lift control means for actuating the latter in response to movement of the gauge, and optionally operable means for controlling the position of the gauge device.

Other objects of the invention will become clear from the following detailed description when read in conjunction with the accompanying drawings, wherein:

Fig. 1 is a view in side elevation of a tractor-mounted plow embodying the features of the present invention; and Fig. 2 is an enlarged detail of the power lift control means.

Referring to the drawings, the implement of the present invention is mounted upon a tractor having a body 10 and rear drive wheels 11, only one of which is shown.

Adapted for mounting upon the tractor is a moldboard plow comprising a tool support or beam 12 suitably connected to the tractor in draft receiving relation and having a downwardly curved rear portion carrying a tool in the form of a plow bottom 13.

The plow is raised and lowered with respect to the tractor by lift means comprising a rock-shaft 14 having secured thereto a rearwardly extending lift arm 15 and an upwardly extending arm 16. Lift arm 15 is connected by a flexible chain 17 with a lug 18 affixed to the plow beam 12. Arm 16 is connected by a rod 19 with a rock arm 20 mounted on the tractor body. Arm 20 is preferably rocked by hydraulic mechanism, not shown, receiving fluid under pressure from a fluid pump, also not shown. The pump is powered from the tractor power plant, and the flow of fluid to the hydraulic mechanism to rock the arm 20 is controlled by valves actuated by movement of an arm 21. As viewed in Fig. 1 of the drawing, rocking of the arm 20 in an anti-clockwise direction will rock the shaft 14 and lift arm 15 to raise the plow out of the ground.

Movement of the arm 21 to actuate the hydraulic lift mechanism is under the control of the tractor operator from his station 22 by manipulation of a control lever 23 carried upon a hub 24 seated in a quadrant 25 mounted on the tractor. A shaft extension 26 of hub 24 has secured to its end a depending arm 27 having attached thereto a block 28 to which is clamped one end of the sheath 29 of a flexible sheath and cable unit 30.

The other end of sheath 29 is anchored to a block 31 carried upon a lug 32 affixed to an upstanding bracket 33 secured to the rear portion of beam 12. A cable 34 slidable in the sheath 29 has its rear end, which extends only a short distance from the end of the sheath, pivotally connected to one of the arms 35 of a bell crank member 36. The other end of the cable projecting forwardly from the forward end of the sheath is connected to lift actuating arm 21.

Bell crank 36 is pivoted upon the upper end of bracket 33 and another arm 37 thereof is pivotally connected by an adjustable member 38 with a standard 39, which carries at its lower end a ground-engaging shoe 40. Shoe 40 is adapted to ride upon the surface of the ground adjacent the plow bottom 13 and to follow the variations in contour of the ground surface. Standard 39 is connected to bracket 33 by a pair of vertically spaced parallel links 41 so that movement of the shoe with respect to the plow bottom is substantially vertical.

It should now be clear that movement of shoe 40 with respect to the working tool, and consequent rocking of the bell crank member will cause cable 34 to slide in its sheath and transmit thrust to move lift actuating arm 21 and rock the arm 20. Thus movement of shoe 40 is translated into vertical movement of the tool 13 to change the operating depth thereof. Should soil condition cause the tool 13 to seek a greater depth the shoe 40 will be moved upwardly relative thereto, bell crank 36 will turn anti-clockwise to exert a pull upon cable 34, which in turn actuates the hydraulic power mechanism to rock the arm 20 anti-clockwise and raise the tool until the desired relationship between the tool 13 and shoe 40 is again achieved.

The position of the gauge shoe with respect to tool 13 determines the operating depth of the tool. Limited adjustment of the shoe as well as raising and lowering of the entire implement may be accomplished by the operator from his seat on the tractor by manipulation of lever 23. This is made possible by the connection of the sleeve 29 to arm 27 of lever 23. Due to the anchoring of the rear end of the cable unit and the friction of the cable in the sheath, movement of lever 23 will move the entire forward end of the cable unit, thus actuating the lift mechanism to move the tool relative to the shoe. Further adjustments may be made by extending or shortening the extensible member 38.

Shoe 40 is urged downwardly to a ground-engaging position by a spring 42 connected between bracket 33 and arm 37 of the bell crank. Another arm 43 of the crank, forming an extension of arm 37 extends between two vertically spaced pins 44 projecting outwardly from the bracket 33. These pins 44 serve as stops to limit the movement in either direction of the shoe 40 relative to the tool. The normal operating position of arm 43 is about midway between the stops 44 and substantially all of the slack has been taken up in chain 17. Since movement of shoe 40 actuates the lifting mechanism the control of the plows operating depth is automatic.

A plow seeks its own depth depending upon its line of draft unless restrained. Thus, upon downward movement, for example, of shoe 40, cable 34 moves actuating arm 21 forward to rock the arm 20 rearwardly putting slack into chain 17, and permitting the plow bottom to seek a greater depth. Upward movement of the shoe reverses this action and causes the plow to be lifted.

It is believed that the present invention should be clearly understood from the foregoing description. It should also be understood that modifications may be made in the invention without departing from the spirit thereof or the scope of the appended claims.

What is claimed is:

1. In an agricultural implement adapted for connection to a tractor having power-operated implement lifting mechanism thereon, actuating means for the lifting mechanism and a manually movable member for controlling said actuating means, a tool support, a tool carried by the support adapted to operate below the surface of the ground, a ground-engaging member carried by the tool support and vertically adjustable with respect thereto to gauge the operating depth of the tool, a flexible conduit anchored at one end to the tool support, a flexible cable slidable in said conduit having one end connected to said actuating means and its other end operatively connected to said ground-engaging member, whereby movement of the latter is transmitted through the cable to said actuating means to vertically move the implement, and means for securing the other end of said conduit to said manually movable member.

2. In an agricultural implement adapted for connection to a tractor having power-operated implement lifting mechanism thereon, actuating means for the lifting mechanism and a manually movable member for controlling said actuating means, a tool support, a tool carried by the support adapted to operate below the surface of the ground, a ground-engaging member carried by the tool support and vertically adjustable with respect thereto to gauge the operating depth of the tool, a flexible conduit anchored at one end to the tool support and having a flexible cable slidable therein and operatively connected to said ground-engaging member, a connection between the other end of the cable and said actuating means to actuate the latter in response to movement of the ground-engaging member, and means for anchoring the other end of the conduit to said manually movable member and movable therewith and with the adjacent end of the cable to actuate said actuating means independently of movement of the ground-engaging means.

3. In an agricultural implement adapted for connection to a tractor having power-operated implement lifting mechanism thereon, actuating means for the lifting mechanism and a manually movable member for controlling said actuating means, a tool support, a tool carried by the support adapted to operate below the surface of the ground, a ground-engaging member carried by the tool support and vertically adjustable with respect thereto to gauge the operating depth of the tool, a flexible conduit anchored at one end to the tool support and having a flexible cable slidable therein and operatively connected to said ground-engaging member, a connection between the other end of the cable and said actuating means to actuate the latter in response to movement of the ground-engaging member, means for anchoring the other end of the conduit to said manually movable member and movable therewith and with the adjacent end of the cable to actuate said actuating means independently of movement of the ground-engaging means, and spring means connected between the tool support and the ground-engaging member for urging the latter toward the ground.

4. In an agricultural implement adapted for connection to a tractor having power-operated implement lifting mechanism thereon, actuating means for the lifting mechanism and a manually movable member for controlling said actuating means, a plow beam connected to the tractor in draft receiving relation and to the lifting mechanism for vertical movement, a plow bottom carried by the beam, a ground-engaging gauge member, generally parallel pivoted links connecting the gauge to the plow beam, means serving as a bell crank pivotally carried by the beam and having an arm connected to the gauge member, a flexible conduit anchored at one end to the plow beam, a flexible rod slidable in the conduit connecting the other arm of the bell crank with the actuating means for actuating the latter in response to vertical movement of the gauge means, spring means urging the gauge means downwardly relative to the plow bottom, and means on the tractor for operating said actuating means independently of movement of the gauge member.

5. In an agricultural implement adapted for connection to a tractor having power-operated implement lifting mechanism thereon, actuating means for the lifting mechanism and a manually movable member for controlling said actuating means, a plow beam connected to the tractor in draft receiving relation and to the lifting mechanism for vertical movement, a plow bottom carried by the beam, a ground-engaging gauge member, generally parallel pivoted links connecting the gauge to the plow beam, means serving as a bell crank pivotally carried by the beam and having an arm connected to the gauge member, a flexible conduit anchored at one end to the plow beam, a flexible rod slidable in the conduit connecting the other arm of the bell crank with the actuating means for actuating the latter in response to vertical movement of the gauge means, and spring means urging the gauge means downwardly relative to the plow bottom, the connection of the bell crank to the gauge member including a member adjustable in length for adjusting the position of the gauge member relative to the plow bottom, and means securing the other end of the said conduit to said manually movable member and movable therewith and with the adjacent end of the cable to actuate said actuating means independently of movement of the gauge member.

CARL W. MOTT.

REFERENCES CITED

The following references are of record in the file of this patent:

UNITED STATES PATENTS

| Number | Name | Date |
|---|---|---|
| 534,426 | Cooper | Feb. 19, 1895 |
| 1,835,631 | Bradley | Dec. 8, 1931 |
| 1,964,383 | Goodyear et al. | June 26, 1934 |
| 2,405,334 | Silver | Aug. 6, 1946 |

FOREIGN PATENTS

| Number | Country | Date |
|---|---|---|
| 541,436 | Great Britain | Nov. 26, 1941 |